(12) United States Patent
Kang et al.

(10) Patent No.: US 12,148,079 B2
(45) Date of Patent: Nov. 19, 2024

(54) METHOD AND APPARATUS FOR COMPOSING BACKGROUND AND FACE BY USING DEEP LEARNING NETWORK

(71) Applicant: Klleon Inc., Seoul (KR)

(72) Inventors: Ji-Su Kang, Seoul (KR); Tae-Min Choi, Daejeon (KR)

(73) Assignee: Klleon Inc., Seoul (KR)

( * ) Notice: Subject to any disclaimer, the term of this patent is extended or adjusted under 35 U.S.C. 154(b) by 0 days.

(21) Appl. No.: 18/567,790

(22) PCT Filed: Jun. 7, 2022

(86) PCT No.: PCT/KR2022/007982
§ 371 (c)(1),
(2) Date: Dec. 7, 2023

(87) PCT Pub. No.: WO2022/260386
PCT Pub. Date: Dec. 15, 2022

(65) Prior Publication Data
US 2024/0265598 A1 Aug. 8, 2024

(30) Foreign Application Priority Data

Jun. 7, 2021 (KR) .......................... 10-2021-0073779

(51) Int. Cl.
*G06T 11/00* (2006.01)
*G06T 5/20* (2006.01)
(Continued)

(52) U.S. Cl.
CPC ................ *G06T 11/60* (2013.01); *G06T 5/20* (2013.01); *G06V 10/32* (2022.01); *G06V 10/82* (2022.01);
(Continued)

(58) Field of Classification Search
None
See application file for complete search history.

(56) References Cited

U.S. PATENT DOCUMENTS

2002/0018595 A1* 2/2002 Kwak ................... G06T 11/60
382/203
2002/0122605 A1* 9/2002 Chang .................. H04N 1/3871
382/284
(Continued)

FOREIGN PATENT DOCUMENTS

| KR | 10-2002-0015642 | 2/2002 |
| KR | 10-2003-0062043 | 7/2003 |

(Continued)

OTHER PUBLICATIONS

International Search Report and the Written Opinion Dated Sep. 16, 2022 From the International Searching Authority Re. Application No. PCT/KR2022/007982 and Its Translation of Search Report Into English. (13 Pages).

(Continued)

*Primary Examiner* — Martin Mushambo

(57) ABSTRACT

The present invention relates to a method and an apparatus for composing a background and a face by using a deep learning network, comprising: receiving an input of an original face image and a converted face image, and extracting data preprocessing and feature vectors for each image; generating a face feature vector mask from the extracted feature vectors; and generating a composite image by performing adaptive object normalization on the basis of the generated face feature vector mask.

10 Claims, 6 Drawing Sheets

(51) Int. Cl.
*G06T 11/60* (2006.01)
*G06V 10/32* (2022.01)
*G06V 10/82* (2022.01)
*G06V 40/16* (2022.01)

(52) U.S. Cl.
CPC .. *G06V 40/171* (2022.01); *G06T 2207/20004* (2013.01); *G06T 2207/30201* (2013.01)

(56) References Cited

U.S. PATENT DOCUMENTS

| | | | |
|---|---|---|---|
| 2005/0111739 A1* | 5/2005 | Ida | G06T 7/13 382/199 |
| 2013/0101216 A1* | 4/2013 | Cho | H04N 19/436 382/173 |
| 2019/0295302 A1* | 9/2019 | Fu | G06T 11/00 |
| 2020/0051303 A1* | 2/2020 | Li | G06N 3/045 |
| 2020/0228729 A1* | 7/2020 | Okuno | G06V 40/165 |
| 2022/0004821 A1* | 1/2022 | Yu | G06V 40/168 |

FOREIGN PATENT DOCUMENTS

| | | |
|---|---|---|
| KR | 10-2009-0088675 | 8/2009 |
| KR | 10-1827168 | 2/2018 |
| KR | 10-2020-0107742 | 9/2020 |
| KR | 10-2021-0019182 | 2/2021 |
| KR | 10-2236904 | 4/2021 |
| KR | 10-2400609 | 5/2022 |

OTHER PUBLICATIONS

Notice of Allowance Dated Apr. 18, 2022 From the Korean Intellectual Property Office Re. Application No. 10-2021-0073779 and Its Translation Into English. (4 Pages).

Notice to Submit a Response Dated Jan. 5, 2022 From the Korean Intellectual Property Office Re. Application No. 10-2021-0073779 and Its Translation Into English. (10 Pages).

* cited by examiner

METHOD AND APPARATUS FOR COMPOSING BACKGROUND AND FACE BY USING DEEP LEARNING NETWORK

RELATED APPLICATIONS

This application is a National Phase of PCT Patent Application No. PCT/KR2022/007982 having International filing date of Jun. 7, 2022, which claims the benefit of priority of Republic of Korea Patent Application No. 10-2021-0073779 filed on Jun. 7, 2021. The contents of the above applications are all incorporated by reference as if fully set forth herein in their entirety.

FIELD AND BACKGROUND OF THE INVENTION

The present invention relates to technology for improving lightweight deep learning model and, more specifically, to a method and an apparatus for composing a background and a face by using a deep learning network, which is configured by integrating multiple networks that are required to naturally composite a face converted using face conversion technology with the background of another image.

Technology for composing a background and a face using deep learning, which is a field of artificial intelligence, has developed to a high level where it can produce high-resolution images. Conventionally, since users directly corrected the background and face images using image correction software, it was common for the quality of corrected images to vary depending on the user. Afterwards, since a deep learning network modeled through data training is used, it has become possible to composite backgrounds and faces more naturally. In order to compose the face converted through face conversion technology with the background of the original image, a face extraction network, a color correction network, and a background composing network, among deep learning networks, are required to be provided.

FIG. 1 is a flowchart showing a background and face composing method, according to the prior art. Referring to FIG. 1, the background and face composing apparatus in the related art receives the original image and converted face image in step 105, inputs the original image into the first face extraction network in step 110, and inputs the converted face images into the second face extraction network in step 120. The first face extraction network extracts the background excluding the face from the original image input in step 115, and the second face extraction network extracts the face excluding the background from the converted face image in step 125.

In step 130, the extracted background and the extracted face are composed and, in step 135, the composed image is input into the color correction network. In step 140, the color correction network generates an image with naturally corrected facial color through color correction. In step 145, the generated image is input into the background composing network and, in step 150, the background and the face boundaries are naturally created to output the resulting image with composed background and face.

In this way, the face extraction network is used to extract only the face excluding the background from the converted face image and extract only the background excluding the face from the original face image. The color correction network is used to naturally correct the color of the converted face because the color of the converted face and the color of the face in the original image are different from each other. In addition, the background composing network is used to naturally connect gaps created by a difference between a face shape of the converted face and a face shape of the face in the original image.

In the case of the background and face composing apparatus in the related art as shown in FIG. 1, since the background and the face are composed through multiple deep learning networks (face extraction, color correction, background composition), using multiple deep learning models results in too many computing operations. This results in problems that high server costs are incurred and a lot of time is consumed in composing the background and the face.

SUMMARY OF THE INVENTION

An objective of the present invention is to provide a method and an apparatus for composing a background and a face, which make lightweight deep learning model possible in an end-to-end deep learning network that composes the background and the face.

An objective of the present invention is to provide a lightweight deep learning model technique that allows integrating multiple networks necessary to naturally compose a face converted by using face conversion technology with the background of the original image.

The present invention provides a method for composing a background and a face using a deep learning network, the method including receiving an original face image and a converted face image, and performing data preprocessing and extracting a feature vector for each; generating a face feature vector mask from the feature vector; and performing adaptive object normalization based on the face feature vector mask to generate a composite image.

Preferably, the performing data preprocessing and the extracting the feature vector includes extracting each face by performing data preprocessing on the original face image and the converted face image, and extracting a feature object from each face and extracting the feature vector based on the feature object.

Preferably, the generating the face feature vector mask may be performed by generating the mask for the face part based on the extracted feature vector.

Preferably, the generating the composite image may include performing adaptive object normalization based on the face feature vector mask by using feature vector extraction information and face feature vector mask information from the original face image and the converted face image.

Preferably, after performing adaptive object normalization on the feature vector and the face feature vector mask of the original face image and the feature vector and the face feature vector mask of the converted face image, the composite image may be generated.

The present invention provides an apparatus for composing a background and a face using a deep learning network, the apparatus including an image input unit that receives an original face image and a converted face image; a face and background composing unit that performs data preprocessing and extracts a feature vector for each image transmitted from the image input unit, generates a face feature vector mask from the extracted feature vector, and performs adaptive object normalization based on the generated face feature vector mask; and a composite image output unit that generates and outputs data obtained by performing normalization as a composite image.

Preferably, the face and background composing unit performs data preprocessing on the original face image and the converted face image to extract each face, and extracts a feature object from each extracted face to extract the feature vector based on the feature object.

Preferably, the face and background composing unit may generate a mask for the face area based on the extracted feature vector.

Preferably, the face and background composing unit may perform adaptive object normalization based on the face feature vector mask using feature vector extraction information and face feature vector mask information from the original face image and the converted face image.

Preferably, after performing adaptive object normalization on the feature vector and the face feature vector mask of the original face image and the feature vector and the face feature vector mask of the converted face image, the composite image may be generated.

According to the present invention, since face extraction, color correction, and background creation deep learning networks are integrated into one deep learning network to allow the amount of computation of the graphics processing unit (GPU) to be reduced by about ⅓, it is possible to reduce the cost of building a server for composing backgrounds and faces, and to expect a composing speed that are more than three times faster than before.

DESCRIPTION OF REFERENCE NUMERALS

200: background and face composing apparatus
210: image input unit
220: face and background composing unit
230: composite image output unit

DESCRIPTION OF SPECIFIC EMBODIMENTS OF THE INVENTION

Hereinafter, the present invention will be described in detail. However, the present invention is not limited by the exemplary embodiments. The purpose and effect of the present invention can be naturally understood or become clearer by the following description, and the purpose and effect of the present invention are not limited to the following description alone. Additionally, when it is determined that a detailed description of known techniques related to the present invention may unnecessarily obscure the gist of the present invention upon describing the same, the detailed description will be omitted.

The present invention concerns a technique for making lightweight deep learning models possible in an end-to-end deep learning network that composes a background and a face. Hereinafter, the present invention will be described in detail with reference to the drawings.

Figure 1:
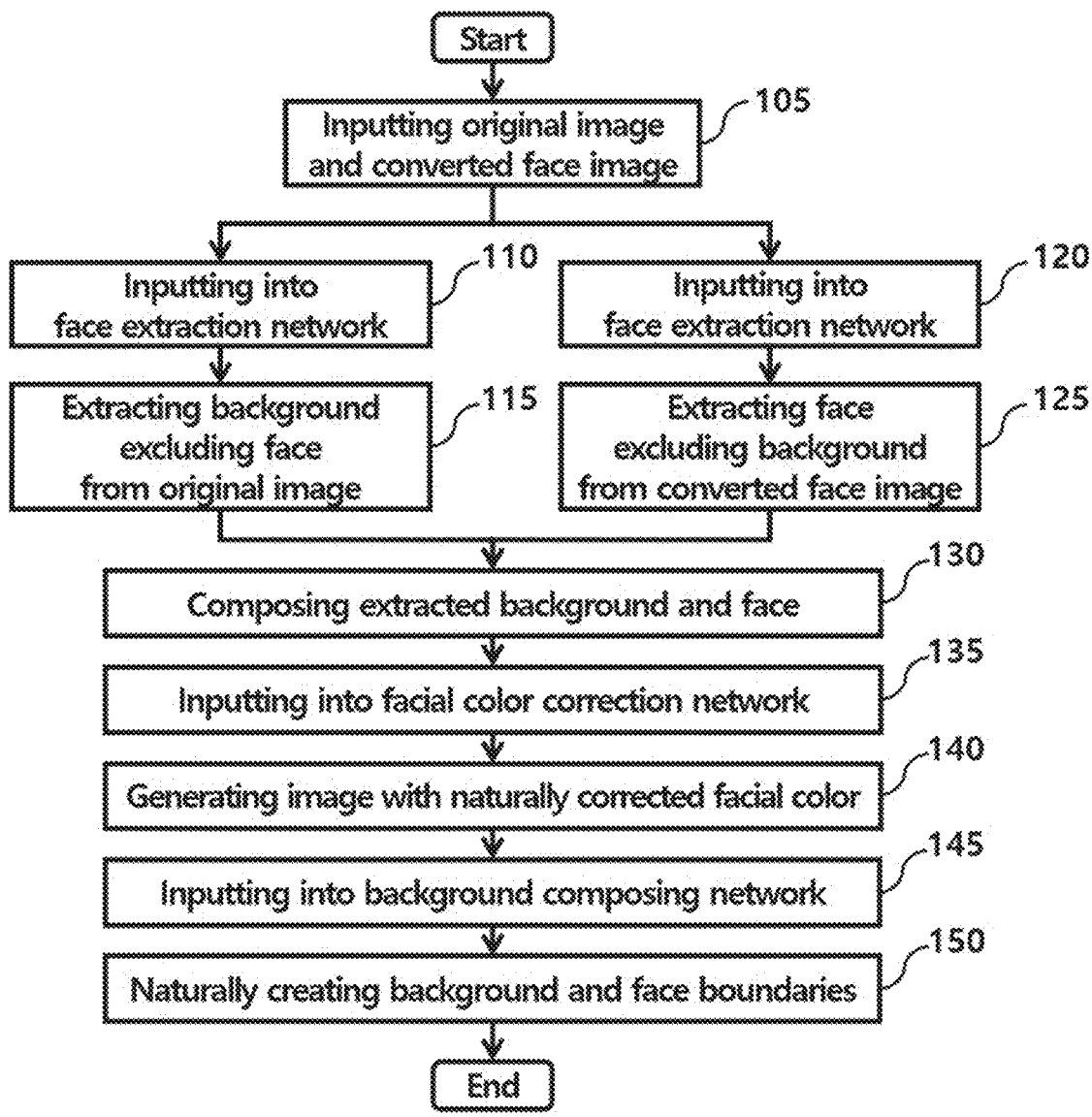
FIG. 1 is a flowchart illustrating a background and face composing method, according to the prior art.
Figure 2:
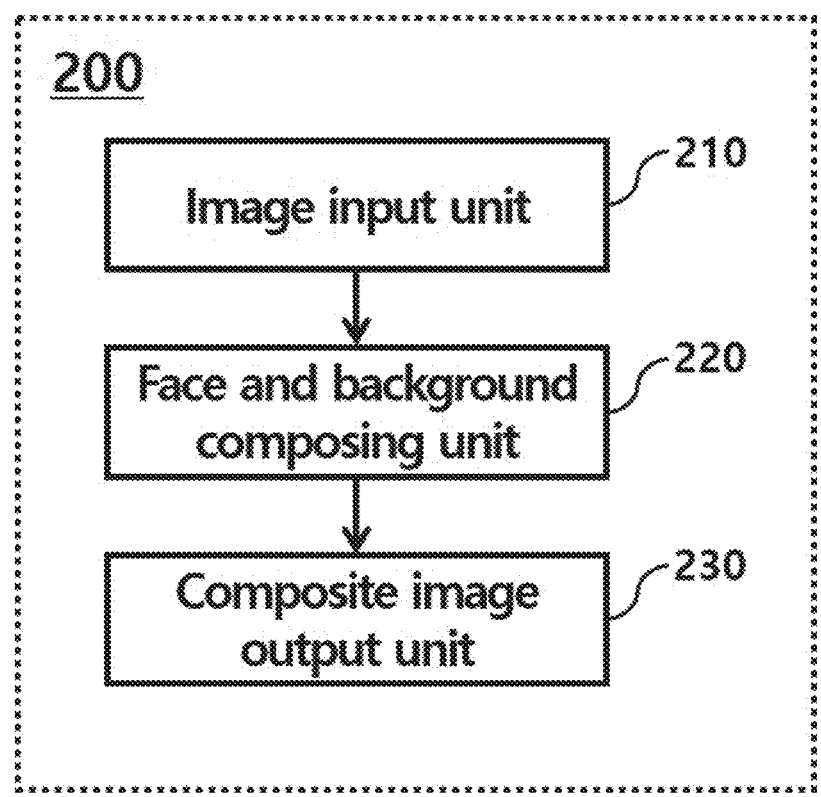
FIG. 2 is a diagram illustrating a background and face composing apparatus, according to an embodiment of the present invention.

FIG. 2 is a diagram illustrating an apparatus for composing a background and a face (hereinafter, referred to a background and face composing apparatus), according to an embodiment of the present invention. Referring to FIG. 2, the background and face composing apparatus 200 may include an image input unit 210, a face and background composing unit 220, and a composite image output unit 230.

The image input unit 210 may receive an original face image and a converted face image from the user terminal. The original face image may be defined as an (hereinafter referred to as image, layer, or video data that "original image') provides the background when composing images, and thus the original face image may be defined as an image consisting of the original face and the background. The converted face image may be defined as an image that provides a face, that is, a converted face, when composing images, and thus the converted face image may be defined as an image consisting of the converted face and the background. The composite image may be defined as an image obtained by composing the background of the original image and the converted face of the converted face image. Meanwhile, the converted face image refers to an image that has been converted so that the user's own or another's face included in the converted face image follows the expression and angle of the face included in another image.

The face and background composing unit 220 includes a face and background composing network, so that it receives the original image and the converted face image from the image input unit 210 to compose the background and the face. Afterwards, the composite image may be transmitted to the image output unit 230, and the image output unit 230 may output the composite image.

Specifically, the face and background composing unit 220 may be implemented in such a manner as to include face extraction and color correction functions in a background creation deep learning network, in order to integrate face extraction, color correction, and background composition deep learning networks. The background creation deep learning network according to the present invention is required to accurately extract the location of the face and create a background around the face considering the color of the face, in order to create a natural background. The background creation deep learning network according to the present invention may simultaneously learn face location information and face color information in the process of learning the background creation, and compose the face and the background by performing learning on face extraction and face color correction through the background creation-based learning.

Specifically, the background creation may be used to naturally connect gaps created by a difference between a face shape of the converted face and a face shape of the face in the original image, and trained on the basis of data labeled for multiple face images. Here, information about the face location and information about the face color may also be labeled and trained at the same time. Therefore, the face extraction is performed in such a manner as to extract only the face area excluding the background from the corresponding image by performing learning on multiple face images.

The face extraction may be performed using an edge extraction method that obtains pixels corresponding to face boundaries. In addition, the color correction may be performed in such a manner as to harmonize the color of the converted face with that of the face in the original image.

Although this image data learning approach may basically be performed in a classification manner that distinguishes background, face, and color based on supervised learning, and a regression manner that predicts vectors, the learning approach may also be performed through clustering based on unsupervised learning.

Although Convolution Neural Network (CNN), Generative Adversarial Networks (GAN), Support Vector Machine (SVM), etc. may be used as a deep learning algorithm to compose the face and the background, various other deep learning algorithms may be applied without limitation.

Figure 3:
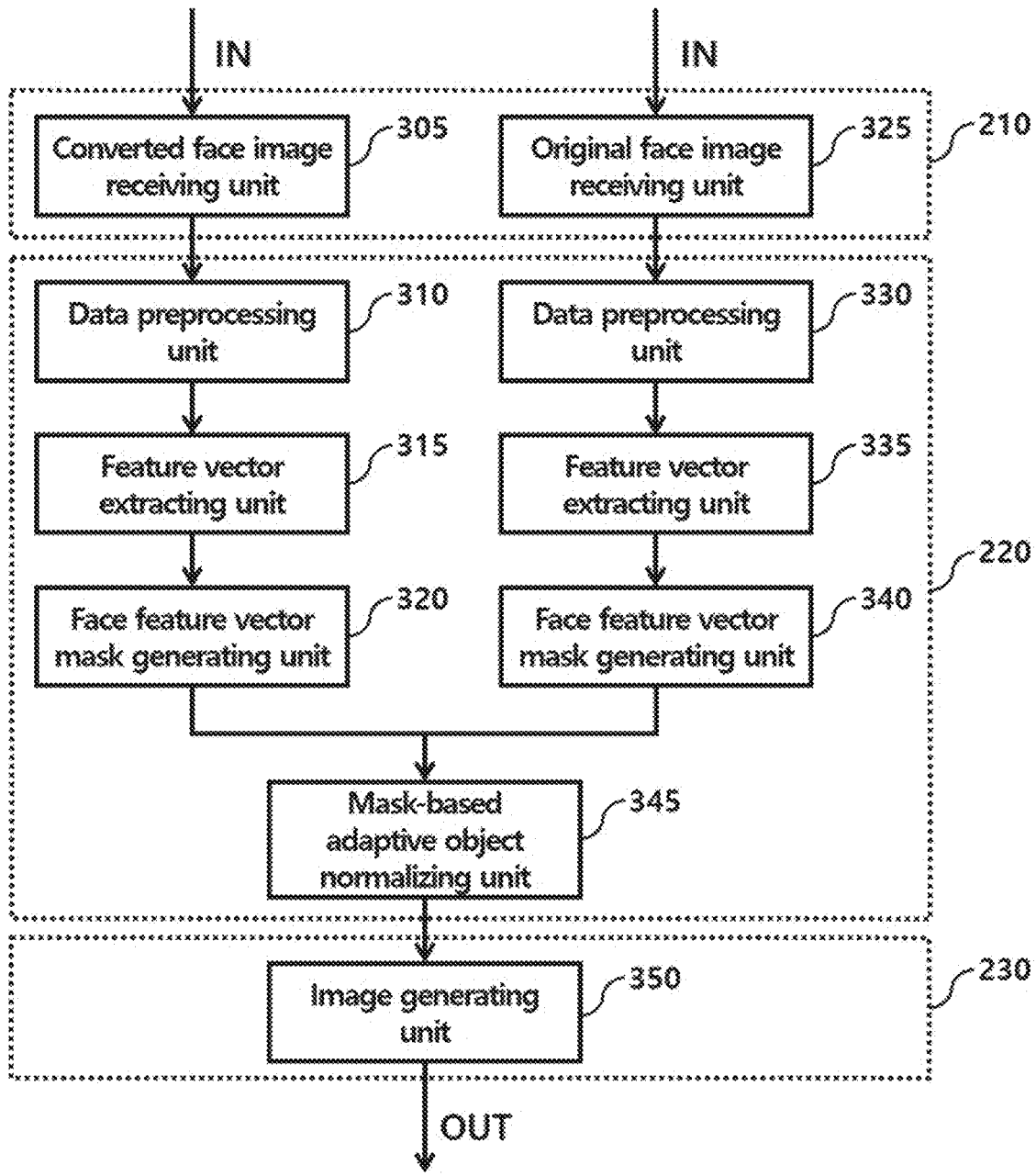
FIG. 3 is a diagram illustrating in detail components of a background and face composing apparatus, according to an embodiment of the present invention.

FIG. 3 is a diagram illustrating in detail components of a background and face composing apparatus, according to an embodiment of the present invention. Referring to FIG. 3, the image input unit 210 of the background and face composing apparatus 200 may include a converted face image receiving unit 305 that receives the converted face image, and an original face image receiving unit 325 that receives the original face image. The images received by each receiving unit may be transmitted to data preprocessing units 310 and 330 of the face and background composing unit 220.

The data preprocessing unit 310 may perform data preprocessing on the converted face image received from the converted face image receiving unit 305, adjust to facilitate feature point detection by extracting the face and preprocessing at least one of the face area, position, color, and brightness, and perform data augmentation and image size alignment for the purpose of composition. In addition, it is possible to align the image size to a preset size. Thereafter, the feature vector extracting unit 315 may extract a feature vector from preprocessed data, detect the position of at least one of the eyes, nose, mouth, and ears from the preprocessed image, set the same as feature points, and then connect the coordinate values of the feature points, thereby extracting the feature vector.

According to one embodiment of the present invention, preset points such as both corners of the eye, the middle of the pupil, both ends of the eyebrow, the middle of the nose, both corners of the mouth, and the upper and lower ends of the ears may be set as the feature points, which may be set through a deep learning network that has been previously trained on the feature points.

The extracted feature vector may be transmitted to a face feature vector mask generating unit 320, and the face feature vector mask generating unit 320 may detect the converted face area based on the received feature vector and generate a feature vector mask.

The data preprocessing unit 330 may perform data preprocessing on the original face image received from the original face image receiving unit 325, and the feature vector extracting unit 335 may extract the feature vector from the preprocessed data and transmit the extracted feature vector to the face feature vector mask generating unit 340. The face feature vector mask generating unit 340 may detect the original face area based on the received feature vector and generate a feature vector mask.

A mask-based adaptive object normalizing unit 345 (adaptive instance normalization; AdaIN) may adjust the normal distribution based on the face feature vector and face feature mask information, and perform adaptive object normalization by identifying the locations of feature objects and comparing them with each other. An image generating unit 350 performs minimum and maximum normalization to change the data range of the composite mask, to a minimum value of 0 and a maximum value of 1, which will be described later, so that the converted face may be composed with the original background. This may enable to reduce the scale difference between objects, and thus reduce the performance difference depending on the model and change the face area between images to the same shape and size.

The composite image output unit 203 may output the resulting image to the user terminal on the basis of the image composed by the image generating unit 350.

Figure 4:
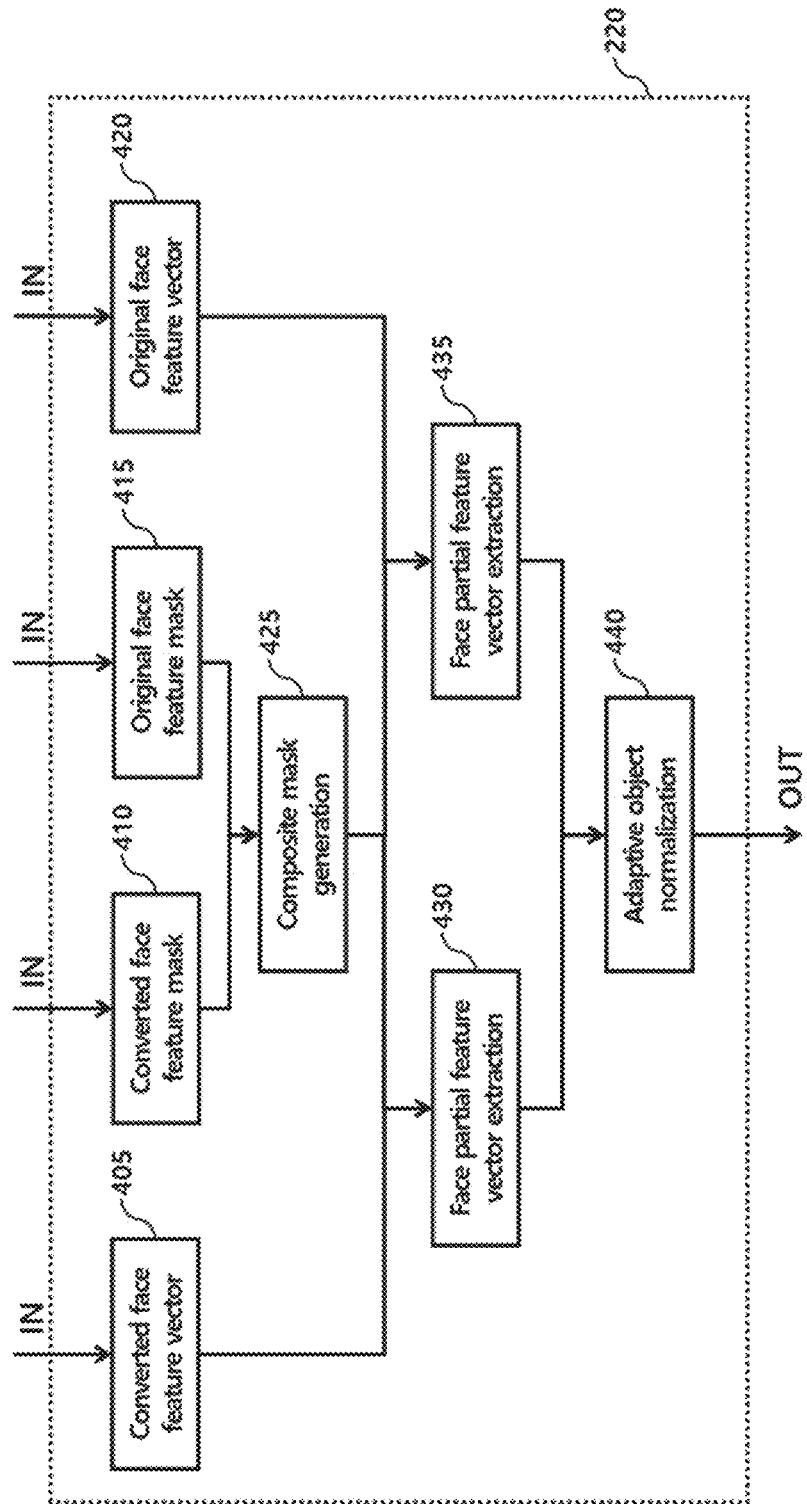
FIG. 4 is a diagram illustrating background and face composing processes using a mask-based adaptive object normalizing unit, according to an embodiment of the present invention.

FIG. 4 is a diagram illustrating background and face composing processes using a mask-based adaptive object normalizing unit, according to an embodiment of the present invention. Referring to FIG. 4, the face and background composing unit 220 of the background and face composing apparatus 200 receive a converted face feature vector 405, a converted face feature mask 410, an original face feature mask 415, and an original face feature vector 420. A composite mask 425 may be generated based on information on the converted face feature mask 410 and the original face feature mask 415. A converted face part feature vector 430 may be extracted using the converted face feature vector 405 and the generated composite mask 425. An original face part feature vector 435 may be extracted using the original face feature vector 420 and the generated composite mask 425. Adaptive object normalization 440 may be performed based on the converted face part feature vector 430 and the original face part feature vector 435. The face and background composing unit 220 may combine the face image converted through mask-based adaptive object normalization into the background of the original image, and correct the color and create the background, thereby outputting natural composite image.

Figure 5:
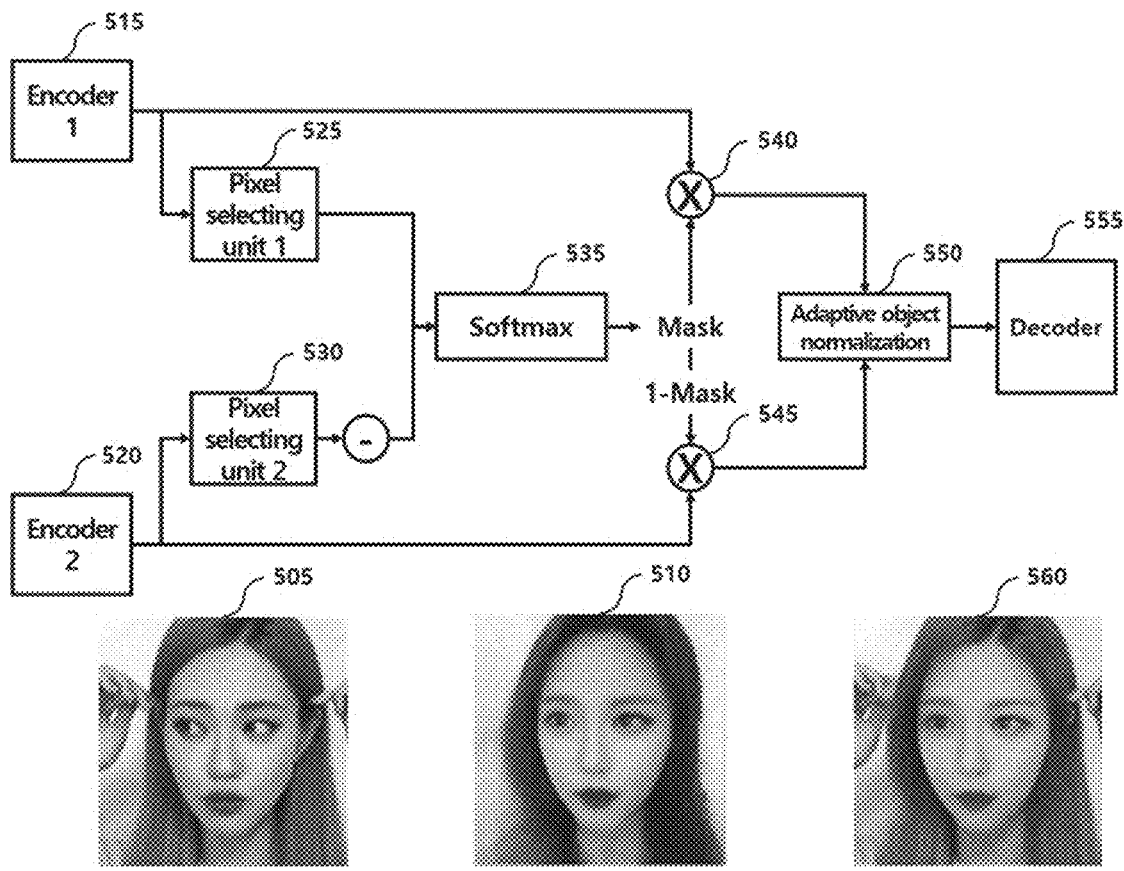
FIG. 5 is a diagram illustrating background and face composing processes using a mask-based adaptive object normalizing unit, according to another embodiment of the present invention.

FIG. 5 is a diagram illustrating background and face composing processes using a mask-based adaptive object normalizing unit, according to another embodiment of the present invention. Referring to FIG. 5, mask-based adaptive object normalization may be performed by creating a composite mask in the face and background composing unit 220 of the background and face composing apparatus 200. Specifically, the original face image 505 may be input to an encoder 1 515, and the converted face image 510 may be input to an encoder 2 520. The encoder 1 515 and the encoder 2 520 are configured with a convolution layer of a deep learning network, so that they may separate the face, color, and background in the input image, and thus extract the feature vector and the feature mask for the face on the basis of the same.

The original face feature mask output from encoder 1 515 is transmitted to a pixel selecting unit 1 525 and then transmitted from the pixel selecting unit 1 525 to a softmax calculating unit 535 through a pixel classification layer, and the converted face feature mask output from the encoder 2 520 may be transmitted to the pixel selecting unit 2 530 and then transmitted from the pixel selecting unit 2 530 to the softmax calculating unit 535 through a pixel classification layer.

The softmax calculating unit 535 may generate a composite mask through a softmax function based on the original face feature mask information and the converted face feature mask information. Thereafter, the original face part feature vector may be extracted by performing convolution 540 on the generated composite mask and the original face feature vector output from the encoder 1 515, and the converted face part feature vector may be extracted by performing convolution 545 on the generated composite mask and the converted face feature vector output from the encoder 2 520. Additionally, adaptive object normalization (Masked AdaIN) 550 may be performed based on the extracted original face part feature vector and converted face part feature vector. The adaptive object normalization may allow maintaining the unique characteristics of the image or video included using its unique mean and variance, by performing normalization on a per-one basis, rather than performing normalization on a per-batch basis in style transfer. The image obtained by the performing adaptive object normalization passes through convolutional filters for inverse processing of the encoder in the decoder 555 thereby correcting the color and creating the background for the composed image, resulting in outputting the resulting image 560.

Figure 6:
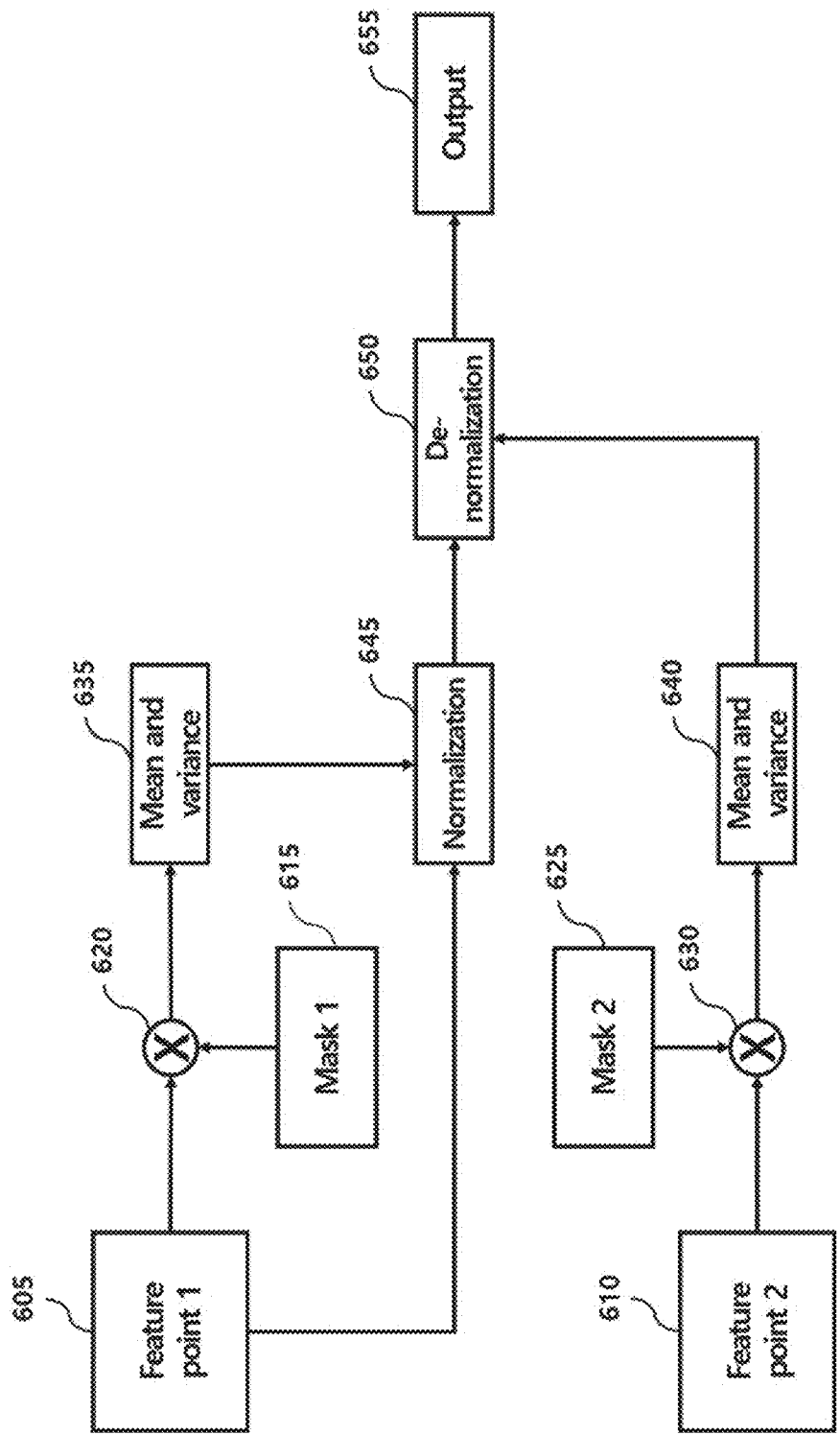
FIG. 6 is a diagram showing background and face composing processes using a mask-based adaptive object normalizing unit, according to still another embodiment of the present invention.

FIG. 6 is a diagram illustrating background and face composing processes using a mask-based adaptive object normalizing unit, according to still another embodiment of the present invention. Referring to FIG. 6, after generating the composite mask at the face and background composing unit 220 of the background and face composing apparatus 200, the original face part feature vector may be extracted by performing convolution 620 on an extracted feature point 1 605 for the original face feature vector and mask 1 615 for the original face feature mask by the encoder for the purpose of mask-based adaptive object normalization, and calculation of the mean and variance 635 is performed on the same, so that adaptive object normalization 645 may be performed.

The converted face part feature mask is extracted by performing convolution 630 on a feature point 2 610 for the converted face feature vector and a mask 2 625 for the converted face feature mask by the encoder, and then is subject to calculation of the mean and variance 640, to perform de-normalization 650 through the decoder along with the image obtained by performing the adaptive object normalization, so that the image may pass through convolutional filters for the inverse process of the encoder, to correct the color and create the background for the composed image, whereby the resulting image may be output (655).

According to the present invention, since face extraction, color correction, and background creation deep learning networks are integrated into one deep learning network to allow the amount of computation of the graphics processing unit (GPU) to be reduced by about ⅓, it is possible to reduce the cost of building a server for composing backgrounds and faces, and to expect a composing speed that are more than three times faster than before.

Meanwhile, the present invention may be implemented as computer-readable code on a computer-readable recording medium. The computer-readable recording medium includes all types of recording devices that store data that may be read by a computer system. Examples of computer-readable recording media include ROM, RAM, CD-ROM, magnetic tape, floppy disks, and optical data storage devices.

Additionally, the computer-readable recording medium may be distributed in a computer system connected to a network, so that the computer-readable code can be stored and executed in a distributed manner. In addition, functional programs, codes, and code segments for implementing the present invention can be easily deduced by programmers in the technical field to which the present invention pertains.

Unless there is a clear order or description to the contrary regarding the steps constituting the method according to the invention, the above steps may be performed in any suitable order. The present invention is not necessarily limited by the order of description of the above steps.

The use of any examples or exemplary terms (e.g., etc.) herein is merely to describe the invention in detail. Unless limited by the scope of the patent claims, the scope of the present invention is not limited by the above examples or exemplary terms. In addition, those skilled in the art will know that various modifications, combinations and changes can be made according to design conditions and factors within the scope of the appended patent claims or their equivalents.

Therefore, the spirit of the present invention should not be limited to the embodiments described above, not only the scope of the patent claims described below, but also all scopes equivalent to or equivalently changed from the scope of this patent claim, will be said to fall within the scope of the spirit of the present invention.

While the present invention has been particularly shown and described with reference to exemplary embodiments thereof, it is to be understood that the invention is not limited to the disclosed embodiments, but various modifications and embodiments will equivalent become apparent to those skilled in the art to which the present invention pertains. Accordingly, the technical scope of the present invention should be defined by the following claims.

The invention claimed is:

1. A method for composing a background and a face using a deep learning network, the method comprising:
   (a) receiving, by an image input unit, an original face image and a converted face image;
   (b) performing, by a data preprocessing unit, data preprocessing on the original face image and the converted face image;
   (c) extracting, by a feature vector extracting unit, a first original face feature vector and a first converted face feature vector from the original face image and the converted face image, respectively;
   (d) generating, by a feature vector mask generating unit, an original face feature vector mask and a converted face feature vector mask from the first original face feature vector and the first converted face feature vector, respectively;
   (e) generating, by a mask-based adaptive object normalizing unit, a composite mask from the original face feature vector mask and the converted face feature vector mask, extracting a second original face feature vector and a second converted face feature vector using the composite mask, respectively, and then performing adaptive object normalization; and
   (f) composing, by an image generating unit, a converted face of the converted face image with a background of the original face image, the background being a remaining part excluding an original face in the original face image, by performing minimum/maximum normalization to change a data range of the composite mask to a minimum value of 0 and a maximum value of 1.

2. The method of claim 1, wherein the step (c) comprises:
   (c1) extracting the original face and the converted face from the original face image and the converted face image, respectively; and
   (c2) extracting a feature object from the original face and the converted face to extract the feature vector based on the feature object, respectively.

3. The method of claim 1, wherein a first encoder extracts the first original face feature vector and generates the original face feature vector mask, wherein a second encoder extracts the first converted face feature vector and generates the converted face feature vector mask.

4. The method of claim 1, wherein the step (e) comprises:
(e1) generating the composite mask from the original face feature vector mask and the converted face feature vector mask;
(e2) extracting the second original face feature vector by performing convolution on the first original face feature vector and the composite mask, and extracting the second converted face feature vector by performing convolution on the first converted face feature vector and the composite mask; and
(e3) performing adaptive object normalization based on the second original face feature vector and the second converted face feature vector.

5. The method of claim 4, wherein the step (e1) comprises:
(e1-1) transmitting the original face feature vector mask and the converted face feature vector mask to a softmax calculating unit through a pixel classification layer of a pixel selecting unit; and
(e1-2) generating, by the softmax calculating unit, the original face feature vector mask and the converted face feature vector mask into the composite mask through a softmax function.

6. An apparatus for composing a background and a face using a deep learning network, the apparatus comprising:
a graphics processing unit (GPU) configured to execute stored executable instructions; and
a non-transitory computer-readable recording medium storing executable instructions that, when executed by a GPU, cause the apparatus to:
receive, by an image input unit, an original face image and a converted face image;
perform, by a data preprocessing unit, preprocessing on the original face image and the converted face image;
extract, by a feature vector extracting unit, a first original face feature vector and a first converted face feature vector from the original face image and the converted face image, respectively;
generate, by a feature vector mask generating unit, an original face feature vector mask and a converted face feature vector mask from the first original face feature vector and the first converted face feature vector, respectively;
generate, by a mask-based adaptive object normalizing unit, a composite mask from the original face feature vector mask and the converted face feature vector mask;
extract, by the mask-based adaptive object normalizing unit, a second original face feature vector and a second converted face feature vector using the composite mask, respectively;
perform, by the mask-based adaptive object normalizing unit, adaptive object normalization; and compose, by an image generating unit, a converted face of the converted face image with a background of the original face image, the background being a remaining part excluding an original face in the original face image, by performing minimum/maximum normalization to change a data range of the composite mask to a minimum value of 0 and a maximum value of 1.

7. The apparatus of claim 6, wherein the executable instructions further cause the apparatus to:
extract, by the feature vector extracting unit, the original face and the converted face from the original face image and the converted face image, respectively; and
extract, by the feature vector extracting unit, a feature object from the original face and the converted face to extract the feature vector based on the feature object, respectively.

8. The apparatus of claim 6, wherein the executable instructions further cause the apparatus to:
extract the first original face feature vector and generate the original face feature vector mask through a first encoder; and
extract the first converted face feature vector and generate the converted face feature vector mask through a second encoder.

9. The apparatus of claim 6, wherein the executable instructions further cause the apparatus to:
generate, by the mask-based adaptive object normalizing unit, the composite mask from the original face feature vector mask and the converted face feature vector mask;
extract, by the mask-based adaptive object normalizing unit, the second original face feature vector by performing convolution on the first original face feature vector and the composite mask;
extract, by the mask-based adaptive object normalizing unit, the second converted face feature vector by performing convolution on the first converted face feature vector and the composite mask; and
perform, by the mask-based adaptive object normalizing unit, adaptive object normalization based on the second original face feature vector and the second converted face feature vector.

10. The apparatus of claim 9, wherein the mask-based adaptive object normalizing unit comprises a pixel selecting unit and a softmax calculating unit, and the executable instructions further cause the apparatus to:
transmit, by the pixel selecting unit, the original face feature vector mask and the converted face feature vector mask to the softmax calculating unit through a pixel classification layer; and
generate, by the softmax calculating unit, the original face feature vector mask and the converted face feature vector mask into the composite mask through a softmax function.

* * * * *